(12) United States Patent
Lal et al.

(10) Patent No.: US 10,437,917 B2
(45) Date of Patent: Oct. 8, 2019

(54) WEB PAGE NONINTRUSIVE CONTENT PROTECTION ON USER DEVICE

(71) Applicant: MICROSOFT TECHNOLOGY LICENSING, LLC, Redmond, WA (US)

(72) Inventors: Rahul Lal, Redmond, WA (US); Abinash Sarangi, Bellevue, WA (US); Marcelo De Barros, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 28 days.

(21) Appl. No.: 15/582,484

(22) Filed: Apr. 28, 2017

(65) Prior Publication Data
US 2018/0314676 A1    Nov. 1, 2018

(51) Int. Cl.
*H04L 29/08*  (2006.01)
*G06F 17/22*  (2006.01)
*G06F 17/21*  (2006.01)

(52) U.S. Cl.
CPC ........ *G06F 17/2247* (2013.01); *G06F 17/211* (2013.01); *G06F 17/2288* (2013.01)

(58) Field of Classification Search
CPC .............. G06F 17/2247; G06F 17/211; G06F 17/2288; G06F 17/30864; G06F 17/30896; G06F 17/24; G06F 17/30011
USPC ....................................................... 715/229
See application file for complete search history.

(56) References Cited

U.S. PATENT DOCUMENTS

| | | | |
|---|---|---|---|
| 8,086,957 B2 | 12/2011 | Bauchot et al. | |
| 9,177,335 B1 | 11/2015 | Carasso | |
| 9,613,209 B2* | 4/2017 | Kapoor | G06F 21/56 |
| 2008/0033956 A1* | 2/2008 | Saha | G06F 17/30867 |
| 2009/0070869 A1* | 3/2009 | Fan | G06F 21/51 726/22 |
| 2010/0162095 A1* | 6/2010 | Tsujii | G06F 17/30864 715/234 |
| 2016/0065672 A1* | 3/2016 | Savage | H04L 67/1095 709/219 |
| 2016/0301735 A1 | 10/2016 | Lind | |

(Continued)

OTHER PUBLICATIONS

Tripathi, Saurabh, "How to Stop AdBlockers From Hurting Your Blog Income?", http://web.archive.org/web/20151020063952/http://www.shoutmeloud.com/disable-adblocker-bloggers.html, Published on: Oct. 20, 2015, 18 pages.

(Continued)

*Primary Examiner* — Scott T Baderman
*Assistant Examiner* — Hassan Mrabi
(74) *Attorney, Agent, or Firm* — Shook, Hardy & Bacon LLP

(57) ABSTRACT

Technologies are provided for protecting nonintrusive content of a web page presented on a user device. A web page is received on a user device including instructions to monitor the web page for changes to the web page, and instructions to restore and freeze content of the web page when a modification has been detected. A content filter filters content on the web page. The filtering is detected on the user device, and the web page is restored with the original content of the web page and the content is frozen on the web page, preventing further modification of the web page.

20 Claims, 5 Drawing Sheets

(56) References Cited

U.S. PATENT DOCUMENTS

2017/0374143 A9* 12/2017 Savage .............. H04L 67/1095
2018/0012256 A1*  1/2018 Napchi ............. G06Q 30/0277
2018/0089208 A1*  3/2018 Saha ................. G06F 17/3089
2018/0139180 A1*  5/2018 Napchi ............. H04L 63/0227

OTHER PUBLICATIONS

Cornel, "Anti-Adblock-Killer Guide to fight Anti-Adblock", https://www.codejuggle.dj/anti-adblock-killer/, Published on: Jul. 20, 2015, 11 pages.

Kastrenakes, Jacob, "Adblock Plus has already defeated Facebook's new ad blocking restrictions", http://www.theverge.com/2016/8/11/12439990/facebook-unblockable-ads-defeated-by-adblock-plus, Published on: Aug. 11, 2016, 10 pages.

"Stop Adblock Killing Your Ad Revenue", https://pagefair.com/blog/2013/stop-adblock-increase-ad-revenue/, Published on: Jul. 26, 2013, 19 pages.

Angelov, Martin, "How to Block Adblock", http://tutorialzine.com/2011/12/how-to-block-adblock/, Published on: Dec. 16, 2011, 5 pages.

Scharnagl, Michael, "Ways to Reduce Content Shifting on Page Load", https://www.smashingmagazine.com/2016/08/ways-to-reduce-content-shifting-on-page-load/, Published on: Aug. 29, 2016, 10 pages.

Bruce, James, "3 Tactics for Dealing with Ad-Block Users on Your Site", http://www.makeuseof.com/tag/3-tactics-dealing-adblock-users-site/, Published on: Apr. 22, 2012, 7 pages.

* cited by examiner

WEB PAGE NONINTRUSIVE CONTENT PROTECTION ON USER DEVICE

BACKGROUND

A web content provider provides content, usually on a web page, for users to consume on a user device. The web content provider may prepare the layout and look and feel of the web page so that it appears in an intended manner on the user device. However, if a user is using a content filter on the user device, the content filter may remove or obscure some content on the web page, causing the web page to not appear in the intended manner, and thus affecting the user's experience with the web page.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

In various embodiments, systems, methods, and computer-readable storage media are provided for nonintrusive content protection of a web page on a user device. For example, a web page can be received at a user device. Prior to rendering the web page on the user device, a content filter may remove or obscure some content from the web page. Thus, the web page may be monitored for changes to the web page, and when a change is detected, the original content can be restored in the web page. The content can then be frozen, preventing further modification of the restored content on the web page.

BRIEF DESCRIPTION OF THE DRAWINGS

Aspects of the disclosure are described in detail below with reference to the attached drawing figures, wherein.

DETAILED DESCRIPTION

Figure 1:
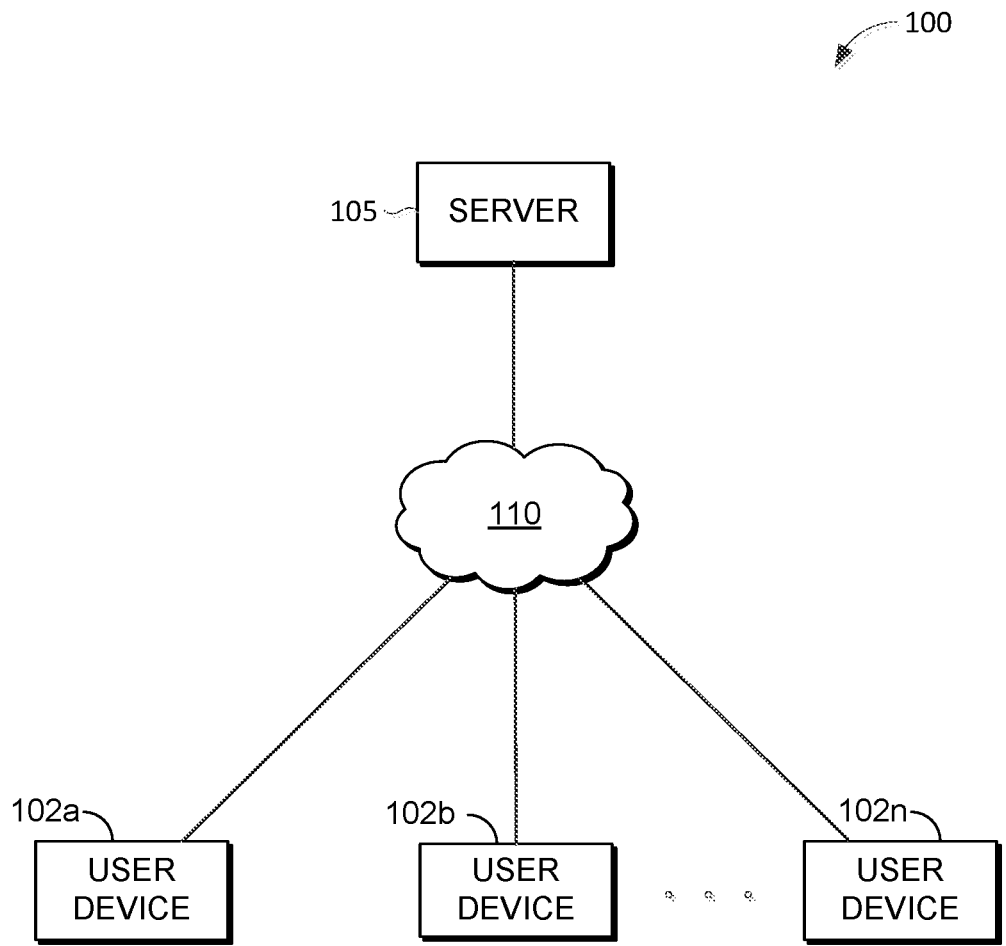
FIG. 1 is a block diagram of an example operating environment suitable for implementations of the present disclosure.

The subject matter of aspects of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various aspects of the technology described herein are generally directed to systems, methods, and computer-readable storage media for nonintrusive content protection of a web page on a user device. By way of example and not limitation, a web page can be received on a user device that contains instructions to monitor the web page for changes, and when a change is detected, to restore the web page to a state prior to the change. The web page can then be frozen, preventing further modification of the web page (or areas of the web page can be frozen, preventing modification of those areas of the web page).

There currently exist conventional means for protecting content of a web page on a user device. For example, the web page can include the content as an image or the content can be encrypted on the web page so that a content filter does not recognize the content to be filtered. However, the conventional means have certain disadvantages. One limitation, for example, is that the conventional means prevent modification to the content, even when the modification is intended by the web content provider or otherwise allowed. Also, for example, if the content is encrypted, a mechanism on the user device must be provided to decrypt the content. Since decrypting is a resource intensive process, the web page may load slower or use more resources, affecting the user's experience with the web page.

Generally, content filters filter content by looking for types of content or categories of content to filter. If content matching the type or category for the content filter, the content filter may either remove the content, e.g., modify the downloaded web page to remove the objects related to the content, or modify the properties of the content so that the content is no longer visible or otherwise obscured on the user device. An ad blocker can also retain a list of providers of advertisements (e.g., URLs of the advertisements) and block content from being received from those providers. One common type of content filter is ad blockers. An ad blocker is an application or service that monitors a web page for advertisements and removes the advertisements from the web page when an advertisement is detected. Usually, the ad blocker filters the content after receipt of the content from a web server but prior to rendering the content in the web page on the user device.

Many free services provided by content providers, e.g., search engines, are supported by advertisements. A web content provider may have to follow applicable laws in terms of content and placement of advertisements on a web page. For example, an applicable law may require advertisements to only appear at a top of the web page, a bottom of the web page, or both the top and bottom of the web page. Since the ad blocker may also be aware of the applicable laws, it can look for advertisements on the web page conforming to the applicable laws, and block those advertisements. For example, if an advertisement must be tagged with an advertisement identifier, the ad blocker can search for that tag and block objects in the web page associated with the tag.

Some web pages follow a Document Object Model (DOM) standard that provides a tree structure that describes the web page. Each node of the tree is an object that represents a portion of the web page. The web content developer can create their web page to follow the DOM standard so that programs and scripts can programmatically make changes to objects in the web page. However, the DOM standard also allows content filters to more easily search for objects associated with the content to be filtered or otherwise modify properties of the objects so that the content is no longer visible on the user device.

A web content provider can be, for example, a search engine. The search engine sends a search results page to a user device in response to a query inputted by the user. The search results page can include images, text, hyperlinks, and other objects. The search engine provider can design the look and feel of the web page. For example, the search engine provider can place images in a particular location on the page so that all of the content can be rendered in a manner intended by the web content provider.

A web content provider may have various reasons for wanting to control the appearance of a web page. For example, if content is removed from the web page, the layout may change or content may be omitted, affecting the user's experience with the web page. In some cases, a third party may provide a benefit to the web content provider to host content on the web page, and a content filter can act to prevent that third-party content from being delivered.

Accordingly, systems, methods, and computer-readable storage media are provided for nonintrusive content protection of a web page on a user device, so that the web page can be restored to its original design. In some embodiments, a web page is sent to the user device containing instructions to monitor areas of the web page for modification. If the web page is modified, e.g., by a content filter, the instructions can restore the portion that was modified and then freeze the web page, preventing further modification.

A web page can be frozen by various means. One means of freezing content is using the Object.freeze( ) method of JavaScript to freeze an object in the web page. The Object.freeze( )method prevents properties from being added or removed, and existing properties from being modified. Thus, after the Object.freeze( ) method has been executed, the object can no longer be modified. One limitation of the Object.freeze( ) method is that it must be run on the user device, i.e., it cannot be run from a web server. Thus, the Object.freeze( ) method competes with other methods and processes to be performed on the web page. If a content filter is run prior to the Object.freeze( ) method, the modified web page may be frozen, preventing the web page from being restored. Thus, by waiting until after the content has been modified or deleted, the system can restore and freeze content on the user device.

Turning now to FIG. 1, a block diagram is provided showing an example operating environment 100 in which some embodiments of the present disclosure may be employed. It should be understood that this and other arrangements described herein are set forth only as examples. Other arrangements and elements (e.g., machines, interfaces, functions, orders, and groupings of functions) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 100 includes a number of user computing devices, such as user devices 102*a* and 102*b* through 102*n*; server 105; and network 110. It should be understood that environment 100 shown in FIG. 1 is an example of one suitable operating environment. Each of the components shown in FIG. 1 may be implemented via any type of computing device, such as computing device 500 described in connection to FIG. 5, for example. These components may communicate with each other via network 110, which may include, without limitation, one or more local area networks (LANs) and/or wide area networks (WANs). In exemplary implementations, network 110 comprises the Internet and/or a cellular network, amongst any of a variety of possible public and/or private networks.

It should be understood that any number of user devices and servers may be employed within operating environment 100 within the scope of the present disclosure. Each may comprise a single device or multiple devices cooperating in a distributed environment. For instance, server 105 may be provided via multiple devices arranged in a distributed environment that collectively provide the functionality described herein. Additionally, other components not shown may also be included within the distributed environment.

User devices 102*a* and 102*b* through 102*n* can be client user devices on the client-side of operating environment 100, while server 105 can be on the server-side of operating environment 100. Server 105 can comprise server-side software designed to work in conjunction with client-side software on user devices 102*a* and 102*b* through 102*n*, so as to implement any combination of the features and functionalities discussed in the present disclosure. This division of operating environment 100 is provided to illustrate one example of a suitable environment, and there is no requirement for each implementation that any combination of server 105 and user devices 102*a* and 102*b* through 102*n* remain as separate entities.

User devices 102*a* and 102*b* through 102*n* may comprise any type of computing device capable of use by a user. For example, in one embodiment, user devices 102*a* through 102*n* may be the type of computing device described in relation to FIG. 5 herein. By way of example and not limitation, a user device may be embodied as a personal computer (PC), a laptop computer, a mobile or mobile device, a smartphone, a tablet computer, a smart watch, a wearable computer, a personal digital assistant (PDA) device, a music player or an MP3 player, a global positioning system (GPS) or device, a video player, a handheld communications device, a gaming device or system, an entertainment system, a vehicle computer system, an embedded system controller, a camera, a remote control, a bar code scanner, a computerized meter or measuring device, an appliance, a consumer electronic device, a workstation, or any combination of these delineated devices, a combination of these devices, or any other suitable computing device.

Server 105 can be a web server configured to provide web pages to user devices 102*a* and 102*b* through 102*n*. The web pages can contain static content (e.g., previously configured and stored on the web server), dynamic content (e.g., created in response to a user input or other event), or both static and dynamic content. Furthermore, server 105 can retrieve content from one or more content servers (not illustrated) and provide the content as a web page to user devices 102*a* and 102*b* through 102*n*.

Figure 2:
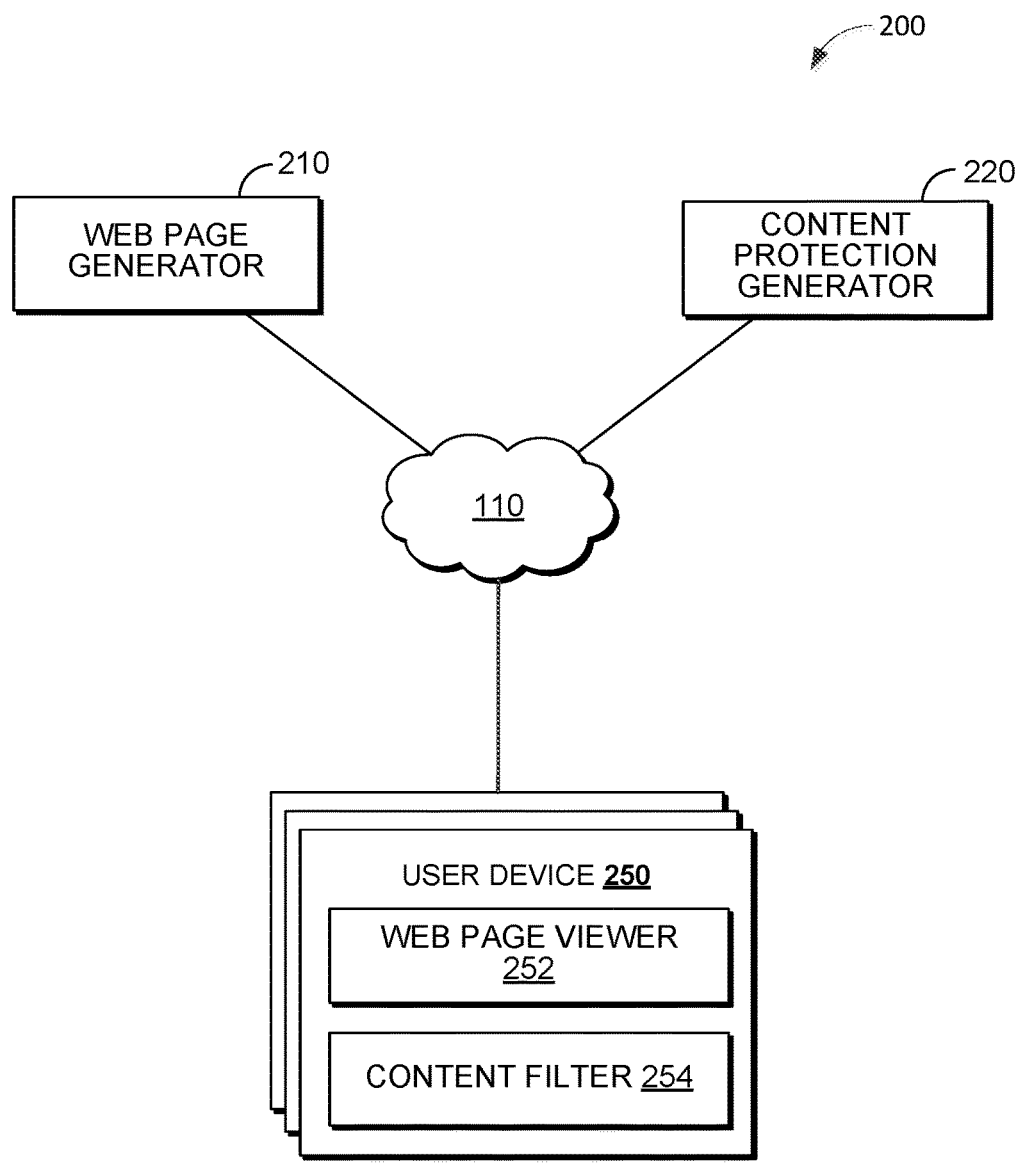
FIG. 2 is a diagram depicting an example computing architecture suitable for implementing aspects of the present disclosure.

Operating environment 100 can be utilized to implement one or more of the components of system 200, described in FIG. 2, including sending web pages with instructions to protect content of a web page on a user device. Operating environment 100 also can be utilized for implementing aspects of methods 300 and 400 in FIGS. 3 and 4, respectively.

Referring now to FIG. 2, with FIG. 1, a block diagram is provided showing aspects of an example computing system architecture suitable for implementing an embodiment of the disclosure and designated generally as system 200. System 200 represents only one example of a suitable computing system architecture. Other arrangements and elements can be used in addition to or instead of those shown, and some elements may be omitted altogether for the sake of clarity. Further, as with operating environment 100, many of the elements described herein are functional entities that may be implemented as discrete or distributed components or in conjunction with other components, and in any suitable combination and location.

Example system 200 includes network 110, which is described in connection to FIG. 1, and which communicatively couples components of system 200 including web page generator 210, content protection generator 220, and one or more user device(s) 250. Web page generator 210, content protection generator 220, and subcomponents of user device(s) 250 may be embodied as a set of compiled computer instructions or functions, program modules, computer software services, or an arrangement of processes carried out on one or more computer systems, such as computing device 500 described in connection to FIG. 5, for example.

Continuing with FIG. 2, web page generator 210 is generally responsible for providing a web page to be viewed on user device(s) 250. In some embodiments, web page generator 210 generates a web page in response to an input from one of user device(s) 250. For example, if web page generator 210 generates a search results web page, the web page can be generated in response to a query from user device(s) 250. It should be understood that web page generator 210 need not generate a web page in response to input from user device(s) 250, and may send a pre-generated web page to be viewed on user device(s) 250. It should also be understood that web page generator 210 may also modify a pre-generated web page to change content on the web page before the web page is sent to user device(s) 250. Web page generator 210 generates a web page with contents of the web page to be displayed on user device(s) 250. In some embodiments, web page generator 210 uses a DOM interface in creation of the web page.

Content protection generator 220 is generally responsible for generating instructions to be added to the web page generated from web page generator 210 to monitor content on the web page (e.g., detect modification of the contents of the web page), and to restore and freeze the web page (e.g., contents of the web page) when the contents of the web page have been modified. Freezing the web page prevents further modification of the web page on user device(s) 250. In some embodiments, the instructions to detect, restore, and freeze are JavaScript instructions. For example, the detecting can be performed by a JavaScript event listener. Javascript further provides instructions as JavaScript code to restore and freeze objects in a web page. In some embodiments, based on predetermined areas of the web page, content protection generator 220 can monitor the predetermined areas. For example, using a DOM interface, objects can be tagged in the web page, and an event listener can listen for changes to the DOM interface (e.g., DOM events), allowing content protection generator 220 to easily determine areas of protection.

User device 250 includes web page viewer 252 and content filter 254. Web page viewer 252 can be, e.g., a web browser. Web page viewer 252 allows a web page to be viewed on user device 250. Content filter 254 serves to block content from being displayed on user device 250. For example, if content filter 254 detects a type or category of content to be blocked on user device 250, content filter 254 can delete the content or otherwise modify the properties of the content so that the content is not visible on user device 250. For example, if content filter 254 is an ad blocker, it can monitor received web pages for indicia of advertisements and block those advertisements.

Figure 3:
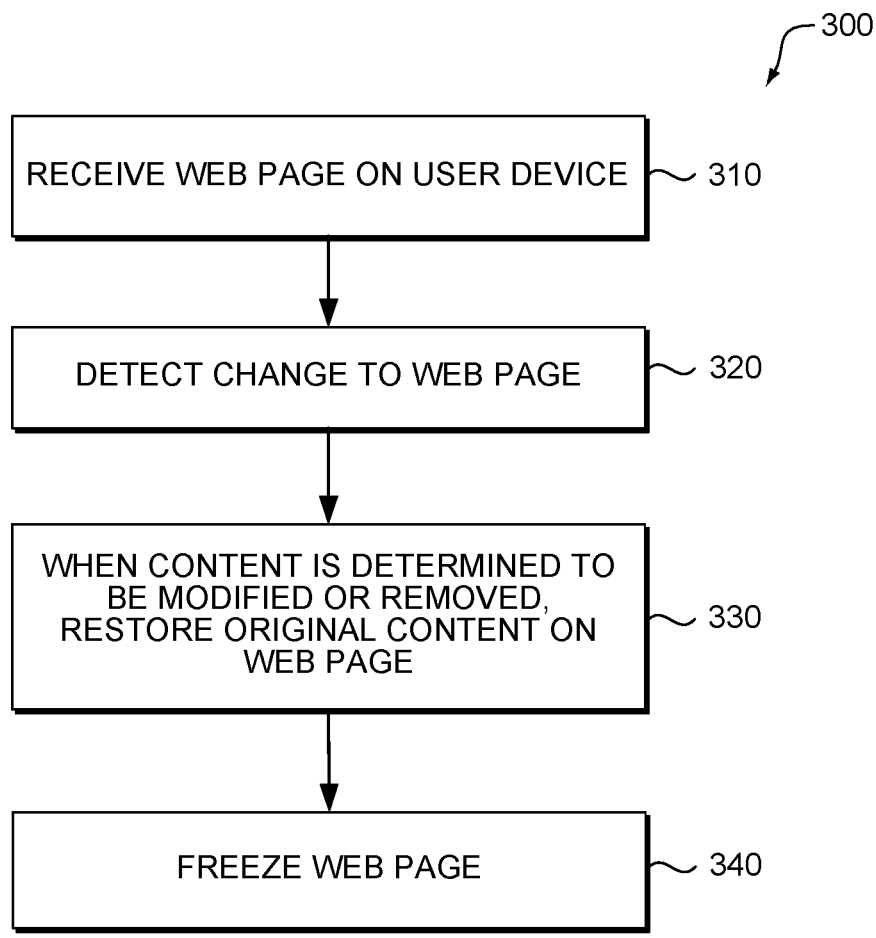
FIGS. 3 and 4 depict flow diagrams of methods for nonintrusive content protection of a web page on a user device, in accordance with embodiments of the present disclosure.

Turning to FIG. 3, a flow diagram is provided illustrating one example method 300 for protecting nonintrusive content of a web page on a user device. In one embodiment, method 300 may be carried out as a cloud-based process or a distributed computing process, using one or more servers or other computing devices. Each block or step of method 300, and other methods described herein, comprises a computing process that may be performed using any combination of hardware, firmware, and/or software. For instance, various functions may be carried out by a processor executing instructions stored in memory. The methods may also be embodied as computer-useable instructions stored on computer storage media. The methods may be provided by a stand-alone application, a service or hosted service (stand-alone or in combination with another hosted service), or a plug-in to another product, to name a few.

At step 310, a web page is received on a user device, such as user device 250 in FIG. 2. For example, a user may enter a search query at a search engine, and the search engine may return a web page with search results corresponding to the query. The web page may include text, images, multimedia objects, etc. The web page also includes instructions to detect modifications to the web page. For example, the web page can include JavaScript to detect changes to the DOM interface (e.g., objects in the web page). The web page can further include instructions to be performed when the instructions do detect a change to the web page.

In some embodiments, the instructions to detect modification can detect modifications to predetermined areas of the web page. A web page can generally include many objects. It may be resource intensive to detect changes to every object of the web page. Furthermore, the web page provider may allow the user to modify certain objects in the web page. Thus, by only detecting changes to predetermined areas of the web page, the provider can identify which object they do not want to be modified or deleted on the user device. Furthermore, by conforming the web page to the DOM standard, it may be a simple task to attach event listeners to specific DOM objects in the web page.

At step 320, a modification to the web page is detected. For example, a content filter may attempt to block some content on the web page. The content filter, e.g., may monitor the web page for tags or other indicia of content to block. When the content filter determines the presence of the content, it can modify the web page to remove or obscure the content. For example, the content filter can remove portions of the web page by removing code between tags of the web page. The content filter can also modify properties of the content so that the content is not visible to the user. Since the web page includes instructions to detect modifications to the web page, when the content filter removes or modifies the contents of the web page, the removal or modification is detected.

At step 330, when the content is determined to have been modified or removed, the original content that was modified or removed is restored on the web page. In some embodiments, the original web page that is sent to the user device is stored. When a change is detected, the modified web page and original web page can be compared and the differences in the page can be restored to the modified web page. This allows other changes to the web page to remain while only restoring areas of the web page determined to be protected areas by the web content developer. It should be understood that restoring the web page from a stored copy of the web page is only described for illustrative purposes and other means to restore a web page are also envisioned. For example, the instructions can also include the content to be restored.

In some embodiments, the restoring is in response to a content filter making changes to properties of the content. For example, the content filter may change the size, color, visibility, or other properties of the content so that the content is not visible or obscured on the user device. The detecting can be configured to detect changes to the properties of the content. In some embodiments, a degree of change to the properties of the content is determined. If the degree of change exceeds a threshold, the content is restored. However, if the degree of change does not exceed the threshold, it may indicate an allowable degree of change, and thus, the content need not be restored. In some embodiments, a white list is used to allow modification of content (or properties of the content) from trusted sources. For example, if a component (or domain hosting the component) is white listed, those components can be allowed to modify the content of the web page.

In some embodiments, the restoring is in response to a content filter removing content on the web page. For example, if the web page is using the DOM standard, the content filter can determine objects in the web page representing the content to be filtered. If the object is removed, a DOM event can be detected and the object can be restored.

At step 340, the web page is frozen. Freezing the web page prevents a content filter from removing the contents again after the web page is restored. For example, some scripting languages provide for the ability to freeze objects in a web page, e.g., prevent removal or modification of sections of the web page.

In some embodiments, a plug-in or stand-alone application can be used to prevent modification of the web page. For example, the instructions in the web page can indicate which sections of the web page to protect. The plug-in or stand-alone application can monitor the web page and restore the web page when a modification has been detected.

In some embodiments, a threshold is used to determine whether to restore a web page. For example, certain modifications may be allowed, e.g., changing a background color. If the predetermined area of the web page is not allowed to be changed, this may cause the predetermined areas and the rest of the web page to appear different, affecting the user's experience. Furthermore, some of the modifications may be minimal, causing the predetermined areas to not be visually affected. In that case, the restoring is prevented, allowing the user device to not expend resources to restore content.

Restoring and freezing content of the web page after the content filter has modified or removed the content has the benefit of not having a race condition with the content filter. For example, if the freezing occurred at the same time as the content filter is modifying or removing content, the freezing may freeze a portion of the web page that has already been modified by the content filter. Another benefit is that if a content filter operates upon receipt of the web page, it may not attempt to modify the page after the page has been restored. Furthermore, the content filter may not be aware that the content has been restored, preventing the content filter from later attempting to remove the content. By allowing the content blocker to act first (e.g., performing actions in response to the content blocker's actions), the content provider can ensure that their actions are performed just prior to rendering.

Figure 4:
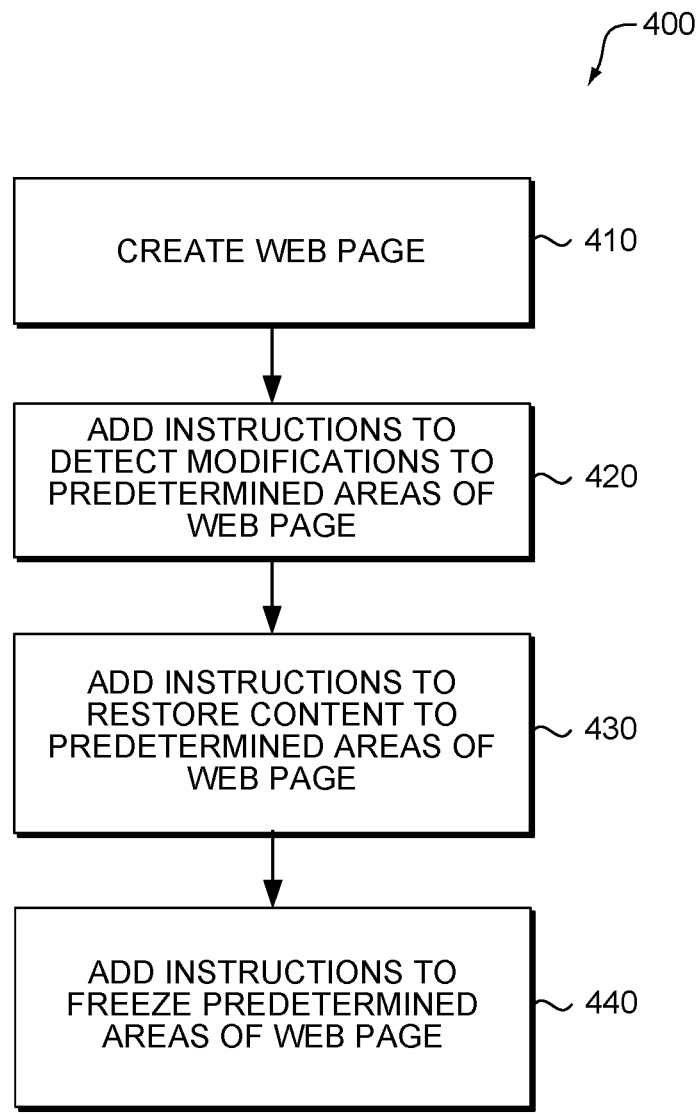

With reference now to FIG. 4, a flow diagram is provided illustrating one example method 400 for protecting nonintrusive content of a web page on a user device. In some embodiments, method 400 may be carried out on a computing device such as server 105 described in FIG. 1.

Accordingly, at step 410, a web page is created. The web page may be created with static content or content retrieved, e.g., based on a user query. The web page may have a predetermined layout with look and feel elements to present the web page on a user device.

At step 420, instructions are added to detect modifications to predetermined areas of the web page. For example, if the web page is static content, the developer can identify areas of the web page to protect. On the other hand, if the web page is dynamic, the web developer can use rules for the instructions to determine which areas to protect. For example, if the content is advertisements, the instructions may include instructions to protect the advertisement content.

At step 430, instructions to restore the content to the predetermined areas of the web page after modification is added. For example, the instructions may identify how to restore the web page. For example, a copy of the web page as intended to be presented may be stored. The stored copy can be used to restore areas of the web page.

At step 440, instructions to freeze the content in the predetermined areas of the web page is added. For example, the code of the web page can be frozen, preventing further modification to the page.

Accordingly, various aspects of technology directed to systems and methods for protecting content of web pages on a user device are described. It is understood that various features, sub-combinations, and modifications of the embodiments described herein are of utility and may be employed in other embodiments without reference to other features or sub-combinations. Moreover, the order and sequences of steps shown in the example methods 300 and 400 are not meant to limit the scope of the present disclosure in any way, and in fact, the steps may occur in a variety of different sequences within embodiments hereof. Such variations and combinations thereof are also contemplated to be within the scope of embodiments of this disclosure.

Figure 5:
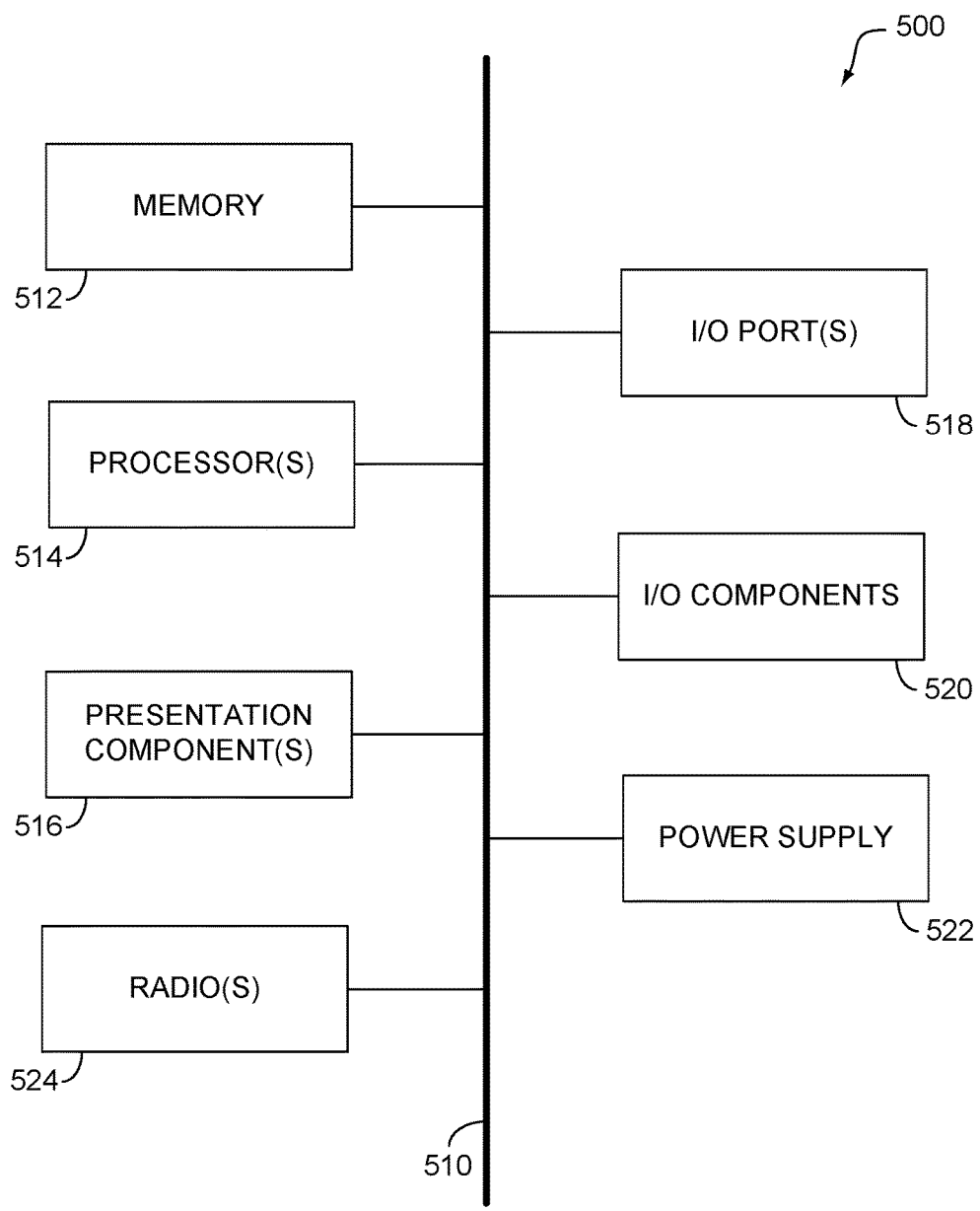
FIG. 5 is a block diagram of an exemplary computing environment suitable for use in implementing an embodiment of the present disclosure.

Having described various implementations, an exemplary computing environment suitable for implementing embodiments of the disclosure is now described. With reference to FIG. 5, an exemplary computing device is provided and referred to generally as computing device 500. The computing device 500 is but one example of a suitable computing environment and is not intended to suggest any limitation as to the scope of use or functionality of embodiments of the disclosure. Neither should the computing device 500 be interpreted as having any dependency or requirement relating to any one or combination of components illustrated.

Embodiments of the disclosure may be described in the general context of computer code or machine-useable instructions, including computer-useable or computer-executable instructions, such as program modules, being executed by a computer or other machine, such as a personal data assistant, a smartphone, a tablet PC, or other handheld device. Generally, program modules, including routines, programs, objects, components, data structures, and the like, refer to code that performs particular tasks or implements particular abstract data types. Embodiments of the disclosure may be practiced in a variety of system configurations, including handheld devices, consumer electronics, general-purpose computers, more specialty computing devices, etc. Embodiments of the disclosure may also be practiced in distributed computing environments where tasks are performed by remote-processing devices that are linked through a communications network. In a distributed computing environment, program modules may be located in both local and remote computer storage media including memory storage devices.

With reference to FIG. 5, computing device 500 includes a bus 510 that directly or indirectly couples the following devices: memory 512, one or more processors 514, one or more presentation components 516, one or more input/output (I/O) ports 518, one or more I/O components 520, and an illustrative power supply 522. Bus 510 represents what may be one or more busses (such as an address bus, data bus, or combination thereof). Although the various blocks of FIG. 5 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 5 is merely illustrative of an exemplary computing device that can be used in connection with one or more embodiments of the present disclosure. Distinction is not made between such categories as "workstation," "server," "laptop," "handheld device," etc., as all are contemplated within the scope of FIG. 5 and with reference to "computing device."

Computing device 500 typically includes a variety of computer-readable media. Computer-readable media can be any available media that can be accessed by computing device 500 and includes both volatile and nonvolatile, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 500. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 512 includes computer storage media in the form of volatile and/or nonvolatile memory. The memory may be removable, non-removable, or a combination thereof. Exemplary hardware devices include solid-state memory, hard drives, optical-disc drives, etc. Computing device 500 includes one or more processors 514 that read data from various entities such as memory 512 or I/O components 520. Presentation component(s) 516 presents data indications to a user or other device. Exemplary presentation components include a display device, speaker, printing component, vibrating component, and the like.

The I/O ports 518 allow computing device 500 to be logically coupled to other devices, including I/O components 520, some of which may be built in. Illustrative components include a microphone, joystick, game pad, satellite dish, scanner, printer, wireless device, etc. The I/O components 520 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 500. The computing device 500 may be equipped with depth cameras, such as stereoscopic camera systems, infrared camera systems, RGB camera systems, and combinations of these, for gesture detection and recognition. Additionally, the computing device 500 may be equipped with accelerometers or gyroscopes that enable detection of motion. The output of the accelerometers or gyroscopes may be provided to the display of the computing device 500 to render immersive augmented reality or virtual reality.

Some embodiments of computing device 500 may include one or more radio(s) 524 (or similar wireless communication components). The radio 524 transmits and receives radio or wireless communications. The computing device 500 may be a wireless terminal adapted to receive communications and media over various wireless networks. Computing device 500 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Many different arrangements of the various components depicted, as well as components not shown, are possible without departing from the scope of the claims below. Embodiments of the disclosure have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

Embodiment 1

A system comprising: a web server, the web server providing a web page to a user device, the web page comprising: contents of the web page to be displayed on the user device; instructions to detect modification of one or more of the contents of the web page; and instructions to restore and freeze the one or more of the contents in response to detecting the modification, the instructions to restore and freeze the web page preventing further modification of the one or more of the contents of the web page on the user device.

Embodiment 2

The system of embodiment 1, wherein the instructions to detect the modification are JavaScript instructions.

Embodiment 3

The system of any of embodiments 1-2, wherein the web page uses a Document Object Model (DOM) interface and the instructions to detect the modification comprise an event listener listening to DOM events of the web page.

Embodiment 4

The system of any of embodiments 1-3, wherein the contents of the web page are determined in response to a user search query.

Embodiment 5

The system of any of embodiments 1-4, wherein the one or more of the contents are located in a predetermined area of the web page, the predetermined area being one of a top, a bottom, or both the top and bottom of the web page.

Embodiment 6

The system of any of embodiments 1-5, wherein the instructions to detect the modification comprise detecting modification to predetermined properties of the one or more of the contents.

Embodiment 7

The system of any of embodiments 1-6, wherein the instructions to detect the modification comprise detecting removal of the one or more of the contents.

Embodiment 8

The system of any of embodiments 1-7, wherein the instructions to detect the modification comprise detecting whether the modification of the one or more of the contents exceeds a threshold, and wherein the instructions to restore and freeze the one or more of the contents comprises when the modification of the one or more of the contents exceeds the threshold, restoring and freezing the one or more of the contents.

Embodiment 9

The system of any of embodiments 1-8, wherein the instructions to restore and freeze the web page comprise restoring content corresponding to the one or more of the contents from a stored version of the content and freezing the restored content to prevent further modification.

Embodiment 10

A system comprising: one or more processors; and computer storage memory having computer-executable instructions stored thereon which, when executed by the processor, protect content on a user device, comprising: sending a search query; receiving results of the search query as a web page; detecting modification of at least one predetermined area of the web page; and restoring and freezing the web page in response to detecting the modification, the restoring and freezing of the web page preventing further modification of the web page.

Embodiment 11

The system of embodiment 10, wherein the detecting the modification comprises listening to changes in a DOM of the web page.

Embodiment 12

The system of any of embodiments 10-11, wherein the at least one predetermined area comprises a top of the web page, a bottom of the web page, or both the top and bottom of the web page.

Embodiment 13

The system of any of embodiments 10-12, wherein the detecting the modification comprises detecting modification to predetermined properties of the at least one predetermined area.

Embodiment 14

The system of any of embodiments 10-13, wherein the detecting the modification comprises detecting removal of the at least one predetermined area on the web page.

Embodiment 15

The system of any of embodiments 10-14, wherein restoring and freezing the web page comprises restoring content corresponding to the modified at least one predetermined area of the web page and freezing the restored content in the at least one predetermined area to prevent further modification.

Embodiment 16

The system of any of embodiments 10-15, wherein instructions to detect modification of the at least one predetermined area of the web page and to restore and freeze the web page in response to detecting the modification are received with results of the search query from a search engine.

Embodiment 17

A computer-performed method for protecting content on a user device, the method comprising: receiving a search query from the user device; and sending a web page with search results responsive to the search query to the user device, the web page comprising: the search results for the search query; instructions to detect modification of predetermined areas of the web page; and instructions to restore and freeze the web page in response to detecting the modification of the predetermined areas, the instructions to restore and freeze the web page preventing further modification of the web page.

Embodiment 18

The method of embodiment 17, wherein the detecting the modification comprises detecting modification to predetermined properties of the web page.

Embodiment 19

The method of any of embodiments 17-18, wherein the detecting the modification comprises detecting removal of a portion of the instructions to display the content of the web page.

Embodiment 20

The method of any of embodiments 17-19, wherein restoring and freezing the web page comprises restoring content corresponding to modified predetermined areas of the web page and freezing the restored content in the predetermined areas to prevent further modification.

What is claimed is:

1. A system comprising:
a web server, the web server providing a web page to a user device, the web page comprising:
contents of the web page to be displayed on the user device;
first instructions to detect modification of one or more of the contents in at least one predetermined area of the web page, the first instructions comprising an event listener listening for modifications to a Document Object Model (DOM) for the web page and the at least one predetermined area comprising at least one of a top or a bottom of the web page; and
second instructions to restore and freeze the one or more of the contents in response to detecting the modification and determining a degree of the modification exceeds a threshold, the second instructions to restore and freeze the web page preventing further modification of the one or more of the contents of the web page on the user device.

2. The system of claim 1, wherein the first instructions to detect the modification are JavaScript instructions.

3. The system of claim 1, wherein the contents of the web page are determined in response to a user search query.

4. The system of claim 1, wherein the at least one predetermined area comprises both the top and bottom of the web page.

5. The system of claim 1, wherein the first instructions to detect the modification comprise detecting modification to predetermined properties of the one or more of the contents.

6. The system of claim 1, wherein the first instructions to detect the modification comprise detecting removal of the one or more of the contents.

7. The system of claim 1, wherein the first instructions to detect the modification comprise detecting whether the modification of the one or more of the contents exceeds the threshold.

8. The system of claim 1, wherein the second instructions to restore and freeze the web page comprise restoring content corresponding to the one or more of the contents from a stored version of the content and freezing the restored content to prevent further modification.

9. A system comprising:
one or more processors; and
computer storage memory having computer-executable instructions stored thereon which, when executed by the one or more processors, perform a method for protecting content on a user device, the method comprising:
providing a web page for presentation;
detecting modification of at least one predetermined area of the web page via an event listener listening to changes in a Document Object Model (DOM) of the web page, the at least one predetermined area comprising at least one of a top or a bottom of the web page; and
restoring and freezing the web page in response to detecting the modification and determining a degree of the modification exceeds a threshold, the restoring and freezing the web page preventing further modification of the web page.

10. The system of claim 9, wherein the at least one predetermined area comprises both the top and bottom of the web page.

11. The system of claim 9, wherein detecting the modification comprises detecting modification to predetermined properties of the at least one predetermined area.

12. The system of claim 9, wherein detecting the modification comprises detecting removal of content at the at least one predetermined area on the web page.

13. The system of claim 9, wherein restoring and freezing the web page comprises restoring content corresponding to the modified at least one predetermined area of the web page and freezing the restored content in the at least one predetermined area to prevent further modification.

14. The system of claim 9, wherein instructions to detect modification of the at least one predetermined area of the web page and to restore and freeze the web page in response to detecting the modification and determining the degree of the modification exceeds the threshold are received with results of a search query from a search engine.

15. A computer-performed method for protecting content on a user device, the method comprising:
receiving a search query from the user device; and
providing a web page with search results responsive to the search query to the user device, the web page comprising:
the search results for the search query;
first instructions to detect modification of predetermined areas of the web page, the first instructions comprising an event listener listening for modifications to a Document Object Model (DOM) for the web page and the predetermined areas of the web page comprising at least one of a top or a bottom of the web page; and second instructions to restore and freeze the web page in response to detecting the modification of the predetermined areas and determining a degree of modification exceeds a threshold, the second instructions to restore and freeze the web page preventing further modification of the web page.

16. The method of claim 15, wherein the detecting the modification comprises detecting modification to predetermined properties of the web page.

17. The method of claim 15, wherein the detecting the modification comprises detecting removal of a portion of instructions to display content of the web page.

18. The method of claim 15, wherein restoring and freezing the web page comprises restoring content corresponding to modified predetermined areas of the web page and freezing the restored content in the predetermined areas to prevent further modification.

19. The method of claim 15, wherein the predetermined areas comprise both the top and bottom of the web page.

20. The method of claim 15, wherein detecting the modification of the predetermined areas of the web page comprises detecting removal of content at the predetermined areas of the web page.

* * * * *